(12) United States Patent  (10) Patent No.: US 7,597,335 B2
Nachbar  (45) Date of Patent: Oct. 6, 2009

(54) CONTROL ARM FOR THE WHEEL SUSPENSION OF A MOTOR VEHICLE

(75) Inventor: Frank Nachbar, Lemförde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 362 days.

(21) Appl. No.: 10/598,651

(22) PCT Filed: Mar. 1, 2005

(86) PCT No.: PCT/DE2005/000353

§ 371 (c)(1),
(2), (4) Date: Sep. 7, 2006

(87) PCT Pub. No.: WO2005/087520

PCT Pub. Date: Sep. 22, 2005

(65) Prior Publication Data

US 2008/0157499 A1   Jul. 3, 2008

(30) Foreign Application Priority Data

Mar. 9, 2004  (DE) ............ 10 2004 011 766

(51) Int. Cl.
B60G 3/12  (2006.01)
(52) U.S. Cl. .................................. 280/124.128
(58) Field of Classification Search .......... 280/124.128, 280/124.116, 124.11, 124.13, 124.132
See application file for complete search history.

(56) References Cited

U.S. PATENT DOCUMENTS

| 2,499,495 | A | * | 3/1950 | Gregory ............... 280/788 |
| 3,131,576 | A |   | 5/1964 | Schilberg et al. |
| 3,434,707 | A | * | 3/1969 | Raidel ............... 267/31 |
| 5,362,090 | A | * | 11/1994 | Takeuchi ............ 280/124.152 |
| 5,366,238 | A | * | 11/1994 | Stephens ............ 280/124.116 |
| 6,062,762 | A | * | 5/2000 | Lustig ............... 403/270 |
| 6,123,349 | A | * | 9/2000 | Depue ............... 280/124.106 |
| 6,688,586 | B1 |  | 2/2004 | Moore |
| 6,827,360 | B2 | * | 12/2004 | Chan et al. ......... 280/124.116 |
| 7,293,787 | B2 | * | 11/2007 | Nunez et al. ........ 280/124.134 |
| 2003/0170069 | A1 | * | 9/2003 | Suzuki et al. ....... 403/122 |
| 2004/0135337 | A1 | * | 7/2004 | Alesso et al. ....... 280/124.134 |
| 2008/0150249 | A1 | * | 6/2008 | Murata ............... 280/124.128 |

FOREIGN PATENT DOCUMENTS

| DE | 42 16 640 C2 | 11/1993 |
| DE | 297 04 863 U1 | 7/1997 |
| JP | 61-233214 | 10/1986 |
| JP | 2003-2670107 | 9/2003 |
| WO | WO 02/074562 A2 | 9/2002 |

* cited by examiner

Primary Examiner—Faye M. Fleming
(74) Attorney, Agent, or Firm—McGlew and Tuttle, P.C.

(57) ABSTRACT

A control arm for the wheel suspension of a motor vehicle with an arm body 1 made of at least one sheet metal part and at least one pivotal point for connection to a fixing point on the vehicle body side is introduced, whereby the pivotal point is designed as a circular mounting bushing 2 for an elastic bearing element 3. According to the present invention, the wall of the mounting bushing 2 is molded in one piece with the arm body 1 and consists of a bearing area 4 having a ring-shaped design as well as a mounting strap 5 fixed on the arm body 1.

20 Claims, 1 Drawing Sheet

CONTROL ARM FOR THE WHEEL SUSPENSION OF A MOTOR VEHICLE

CROSS REFERENCE TO RELATED APPLICATIONS

This application is a United States National Phase application of International Application PCT/DE2005/000353 and claims the benefit of priority under 35 U.S.C. § 119 of German Patent Application DE 10 2004 011 766.7 filed Mar. 9, 2004, the entire contents of which are incorporated herein by reference.

FIELD OF THE INVENTION

The present invention pertains to a control arm for the wheel suspension of a motor vehicle with an arm body made of at least one sheet metal part and at least one pivotal point located on the arm body for the connection to a fixing point on the vehicle body side, whereby the pivotal point is designed as a circular mounting bushing for an elastic bearing element.

BACKGROUND OF THE INVENTION

Control arms of this type are also called suspension arms and usually consist of single or double steel sheets connected to one another, whereby the sheet construction can be provided in sections to increase the stiffness with corrugations or edgings. The control arms in this case have pivotal points for fixing wheel-related components as well as, in addition, pivotal points for fixing the control arm on the vehicle body side. These pivotal points are usually designed such that a certain mobility, which is created by means of an elastic bearing, for example, by means of rubber elements, is guaranteed in these points. These rubber elements are mounted on the control arm in circular mounting bushings, which, in the state of the art, are connected to the actual arm body in various ways.

For example, auxiliary housings, which are bolted on or riveted on the control arm as separate components, are known. Other types of construction provide for connecting additional sheet metal shells for mounting rubber elements or corresponding mounting bushings to the arm housings, for example, by means of welding operations.

All of the structural measures described have the drawback that the mounting bushings or bearing components to be connected to the arm housing are manufactured in separate production steps and are then to be connected to the actual arm housing. This means an increased number of production steps and mounting steps and increased production costs connected therewith, whereby, moreover, additional components have negative consequences in relation to warehousing costs.

In addition, possibilities of providing two-sheet arm bodies, which consist of upper and lower parts welded to one another, with two-part mounting bushings, as this is disclosed, for example, in Patent Application WO 02/074562 A2, have become known from the state of the art. The drawback of the structural embodiment shown there lies in an increased inaccuracy of the mounting bushing as a result of the split located in the mounting plane.

SUMMARY OF THE INVENTION

Therefore, starting from the existing state of the art, the object of the present invention is to provide a design of a control arm for the wheel suspension of a motor vehicle in relation to its pivotal points, particularly to the vehicle body, so that a simplified, cost-effective production is guaranteed and the control arm is optimized with regard to its weight.

According to the invention, a control arm for the wheel suspension of a motor vehicle is provided with an arm body made of at least one sheet metal part and with at least one pivotal point or region for connection to a fixing point on the vehicle body side. The pivotal point is designed as a circular mounting bushing for an elastic bearing element. This mounting bushing is molded in one piece with the arm body. The mounting bushing comprises a bearing area having a ring-shaped design as well as a mounting strap fixed on the arm body.

This object is accomplished according to the present invention in that the wall of the mounting bushing is molded in one piece with the arm body and consists of a bearing area having a ring-shaped design as well as a mounting strap fixed on the arm body.

Due to this structural design, the additional components of the pivotal points, which were needed up to now for the manufacture of the control arms of this class, are omitted; moreover, the manufacture of the arm body is simplified in that the shaping of the necessary mounting bushing for the elastic bearing element can be performed simultaneously with the transforming of the sheet components used for the arm body.

For the fixing of the mounting strap on the arm body, it has proven to be advantageous if this strap is fixed on the arm body by means of welding, gluing, riveting, bolting, clinching or tox clinching. The types of fixing mentioned represent a cost-effective variant of the processing in relation to the necessary manufacturing procedures.

In addition, it has proven to be expedient to design the bearing area and the mounting strap, such that these essentially have identical width dimensions.

Two exemplary embodiments of the subject of the present invention are explained in detail below based on the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
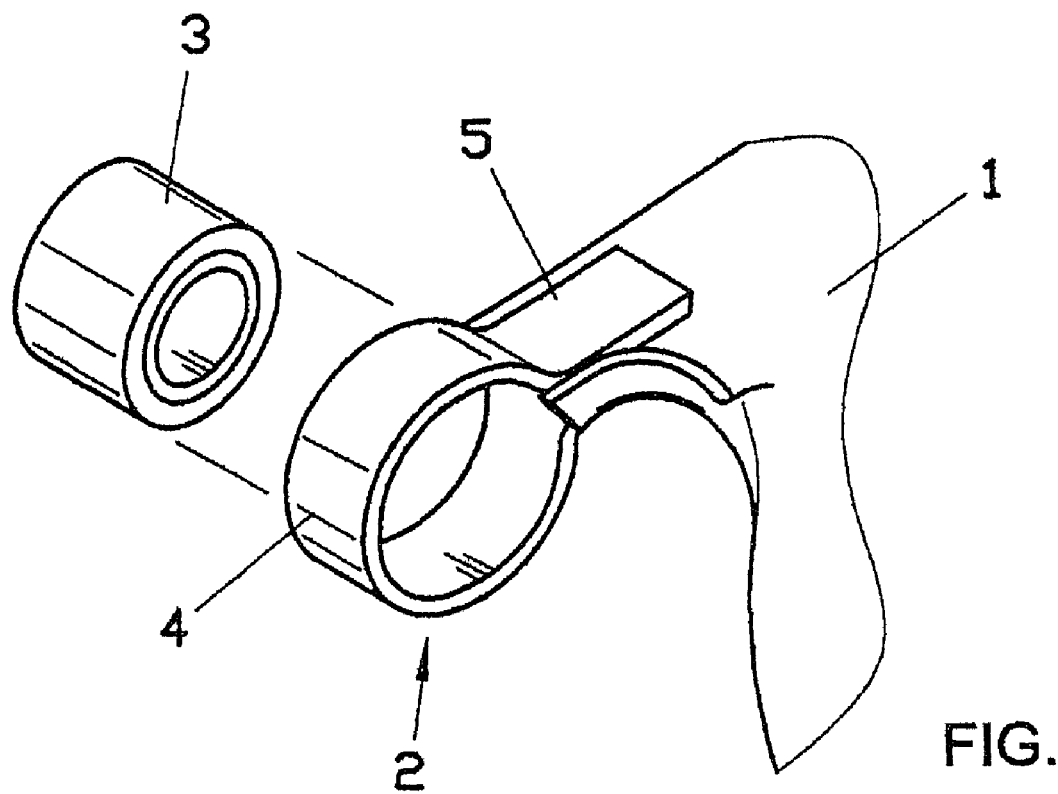
FIG. 1 is a partial view of a control arm according to the present invention in the area of the pivotal point in case of a one-sheet embodiment of the arm body.

Referring to the drawings in particular, the arm body 1 of a control arm according to the present invention shown in FIG. 1 consists of a steel sheet component, in which a mounting bushing, identified in its entirety by 2, is arranged in a corner area. A schematically shown bearing element 3 in the form of a rubber ring is inserted into the mounting bushing. The mounting bushing 2 consists, as this is evident from FIG. 1, of a bearing area 4 of a ring-shaped design as well as a mounting strap 5. In the exemplary embodiment shown, the bearing area 4 and the mounting strap 5 have the same width and are molded in the shape of a strap in the unmolded raw state of the arm body as a component of the latter. Within the framework of the transforming process for manufacturing the final arm body contour, the bearing area 4 has a ring-shaped design, and the mounting strap 5 is molded on such that it comes to lie on the top side of the arm body 1. In a final procedure, the mounting strap 5 is then undetachably connected to the arm body by means of a welding or gluing procedure. The welding procedure can be carried out by means of spot welding. As an alternative to this, welding around the edges of the mounting strap is conceivable.

Figure 2:
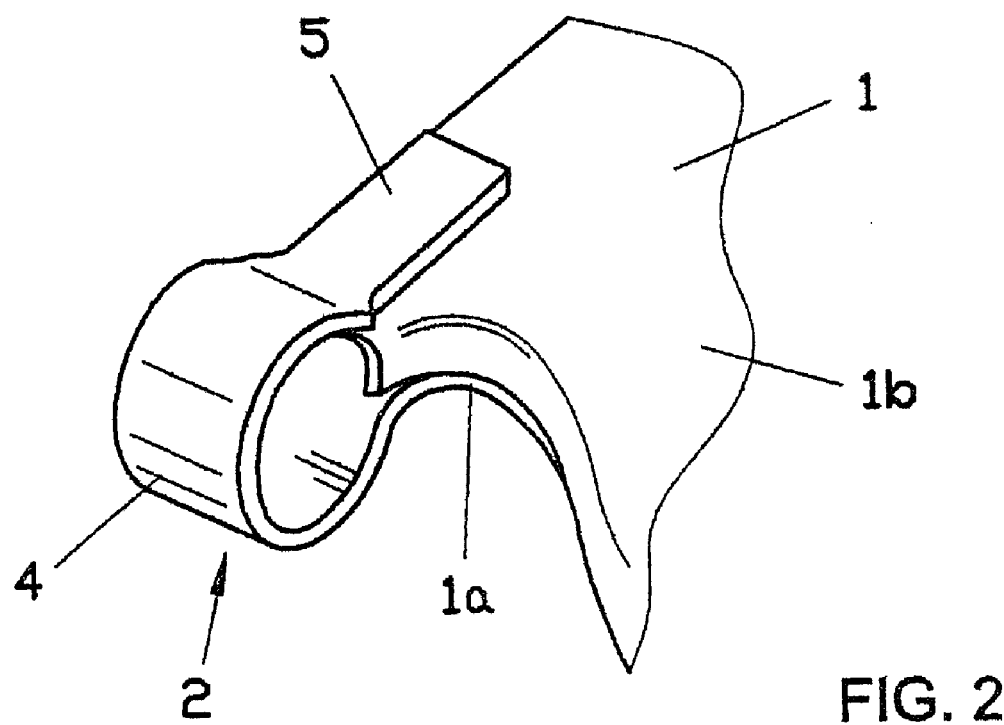
FIG. 2 is a partial view of another control arm according to the present invention in the area of the pivotal point in case of a two-sheet embodiment of the arm body.

The exemplary embodiment shown in FIG. 2 is distinguished from the one shown in FIG. 1 in that here the arm body 1 is composed of a lower sheet 1a and an upper sheet 1b. The upper sheet 1b and the lower sheet 1a are welded to one another. The mounting bushing 2 is embodied as a strap of the lower sheet 1a in the unprocessed state of the arm body 1 and is transformed within the framework of the production process, such that, on the one hand, the bearing area of a ring-shaped design is produced for accommodating an elastic bearing element as well as the mounting strap 5 in a complementary manner. In the embodiment shown, the mounting strap 5 comes to lie on the top side of the upper sheet 1b and, similar to the view in FIG. 1, is fixed here by means of gluing, welding or riveting on the upper sheet 1b.

While specific embodiments of the invention have been shown and described in detail to illustrate the application of the principles of the invention, it will be understood that the invention may be embodied otherwise without departing from such principles.

The invention claimed is:

1. A control arm for the wheel suspension of a motor vehicle, the control arm comprising:
   an arm body made of at least one sheet metal part; and
   at least one pivotal point for connection to a fixing point on the vehicle body side, whereby the pivotal point is designed as a circular mounting bushing for an elastic bearing element, wherein a wall of said mounting bushing is integrally formed with said arm body molded in one piece to define a one piece mounting bushing arm body structure, said wall comprising a bearing area having a ring-shaped design as well as a mounting strap fixed on said arm body.

2. A control arm in accordance with claim 1, wherein said mounting strap is fixed on said arm body by means of welding.

3. A control arm in accordance with claim 1, wherein said mounting strap is fixed on said arm body by means of gluing.

4. A control arm in accordance with claim 1, wherein said mounting strap is fixed on said arm body by means of riveting.

5. A control arm in accordance with claim 1, wherein said mounting strap is fixed on said arm body by means of bolting.

6. A control arm in accordance with claim 1, wherein said mounting strap is fixed on said arm body by means of clinching.

7. A control arm in accordance with claim 1, wherein said mounting strap is fixed on said arm body by means of tox clinching.

8. A control arm in accordance with claim 1, wherein said bearing area and said mounting strap essentially have identical width dimensions.

9. A motor vehicle wheel suspension control arm comprising:
   an arm body made of at least one sheet metal part; and
   a circular mounting bushing comprising a wall molded with said at least one sheet metal part such that said wall forms an integral part of said arm body to define a one piece arm body mounting bushing structure, said circular mounting bushing including a bearing area with a ring-shape as well as a mounting strap.

10. A control arm in accordance with claim 9, wherein said mounting strap is fixed on said arm body by welding.

11. A control arm in accordance with claim 9, wherein said mounting strap is fixed on said arm body by glue.

12. A control arm in accordance with claim 9, wherein said mounting strap is fixed on said arm body by one or more rivets.

13. A control arm in accordance with claim 9, wherein said mounting strap is fixed on said arm body by one or more bolt.

14. A control arm in accordance with claim 9, wherein said mounting strap is fixed on said arm body by a clinch connection.

15. A control arm in accordance with claim 9, wherein said mounting strap is fixed on said arm body by a tox clinch connection.

16. A control arm in accordance with claim 9, wherein said bearing area and said mounting strap essentially have identical width dimensions.

17. A control arm in accordance with claim 1, further comprising:
   a bearing element in said ring-shape bearing area.

18. A motor vehicle wheel suspension control arm formed by the steps comprising:
   molding a one piece arm body mounting structure including a single sheet of metal forming at least a part of an arm body and a circular mounting bushing with a wall, a ring-shape bearing area and a mounting strap, said wall being integrally connected to said arm body; and
   fixing the mounting strap to said arm body.

19. A motor vehicle wheel suspension control arm according to claim 18, further comprising:
   providing another metal sheet, wherein said arm is formed of said metal sheet connected to said another metal sheet.

20. A motor vehicle wheel suspension control arm according to claim 18, further comprising:
   an elastic bearing element in said ring-shape bearing area.

* * * * *